June 17, 1952 J. F. OVARY 2,601,053
MIXING AND FLOW CONTROLLING VALVE
Filed Dec. 29, 1948 3 Sheets-Sheet 1
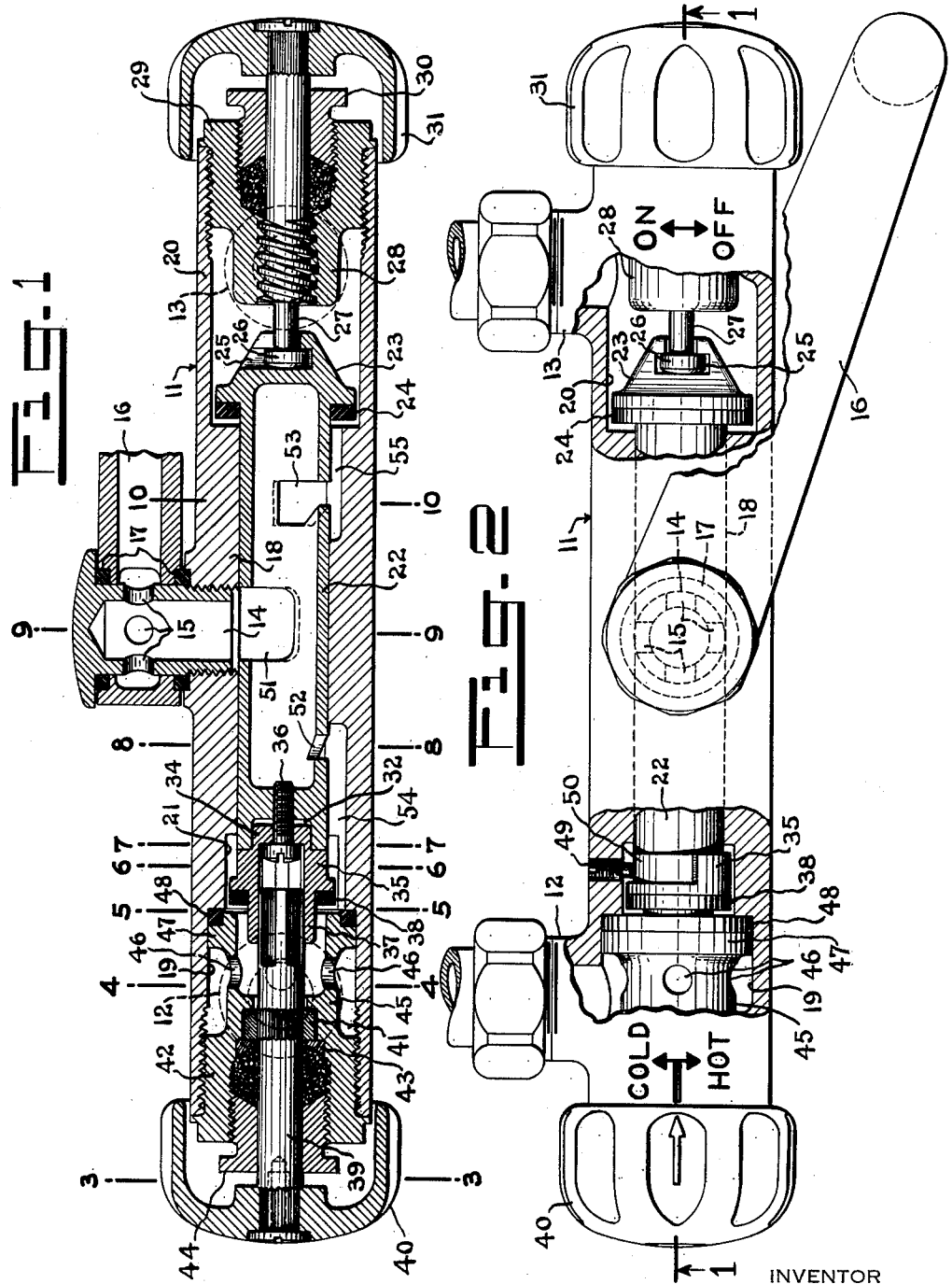
INVENTOR
JOHN F. OVARY
BY
ATTORNEY June 17, 1952  J. F. OVARY  2,601,053
MIXING AND FLOW CONTROLLING VALVE
Filed Dec. 29, 1948  3 Sheets-Sheet 2
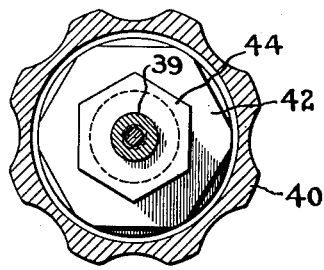
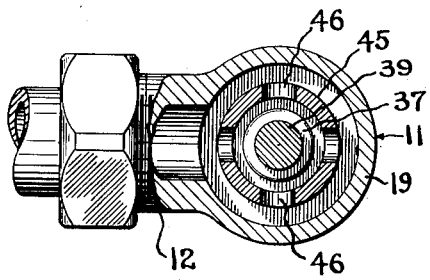
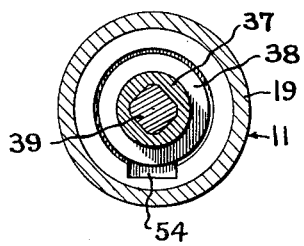
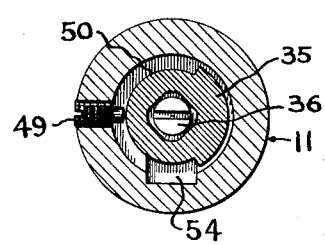
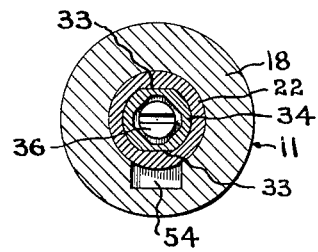
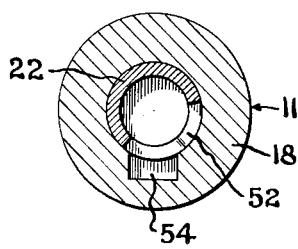
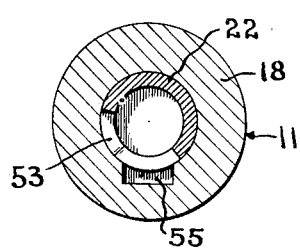
INVENTOR
JOHN F. OVARY
ATTORNEY June 17, 1952   J. F. OVARY   2,601,053
MIXING AND FLOW CONTROLLING VALVE
Filed Dec. 29, 1948   3 Sheets-Sheet 3
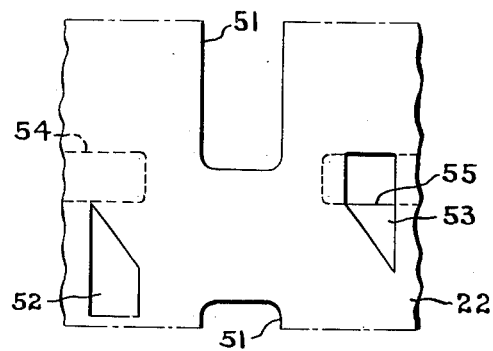
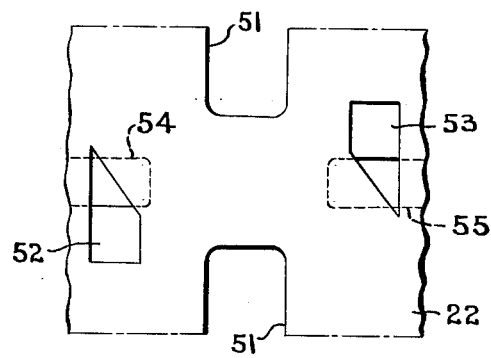
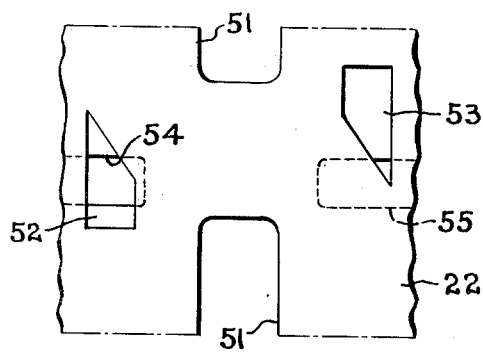
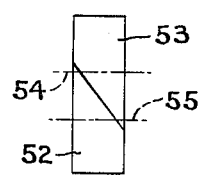
INVENTOR
JOHN F. OVARY
ATTORNEY Patented June 17, 1952

2,601,053

UNITED STATES PATENT OFFICE 2,601,053

MIXING AND FLOW CONTROLLING VALVE

John F. Ovary, New York, N. Y.

Application December 29, 1948, Serial No. 67,780

5 Claims. (Cl. 277—18)

This invention relates to valves designed for controlling the mixing and flow of fluids, and specifically to valves for controlling the mixing of hot and cold water to obtain the desired temperature and rate of flow.

One object of the invention is to provide a valve structure in which one operating handle or knob controls the opening, adjusting and closing of several fluid inlet ports, simultaneously and to the same degree, and a second handle or knob controls the degree of mixture or temperature and the flow to the discharge outlet.

A further object is to provide a valve structure in which one handle or knob controls the volume flow from several inlet ports, and a second handle or knob controls the degree of mixture or temperature without affecting the volume of discharge, or vice versa, for varying the rate of flow or discharge without varying the degree of mixture or temperature.

A further object is to provide a valve structure adapted to control the separation or distribution of fluid from a single supply line into separate channels at equal or varying rates of flow.

In carrying the invention into effect I provide a single control for opening, adjusting and closing two or more inlet ports simultaneously to the same degree to control or regulate the volume of fluid entering a mixing chamber, and a single control for regulating the degree of mixture or temperature of the several fluids and the volume entering the mixing chamber from the inlet ports and the discharge from the mixing chamber through the outlet port or spout. The same combination may be reversed in its action by employing the outlet port as an inlet, and the two or more inlet ports of the chamber as the outlets to separate channels in which case the mixing chamber operates as a distributor to control the flow into the separate outlet channels.

The invention is illustrated in the accompanying drawings as employed with a hot and cold water supply, in which, Figure 1 is a longitudinal vertical section of the valve structure on the line 1—1 of Figure 2.

Figure 2 is a top plan view of the valve structure with parts of the upper surface of the valve body broken away to show certain details of construction.

Figures 3 to 10, inclusive, are cross-sectional views of the valve body at the lines 3—3 to 10—10 of Figure 1, and Figures 11 to 14, inclusive, are enlarged diagrammatic views illustrating the means and method for simultaneously controlling or varying the admittance of fluid from the several inlet ports to the mixing chamber to obtain or regulate the degree of mixture or temperature while maintaining the desired volume of discharge.

Referring to the drawings, and more particularly to Figures 1 and 2, in which the valve structure is shown as specifically designed for use in controlling the flow and mixing of hot and cold water, it will be observed that the valve body comprises a cylindrical member 11 having two externally screw-threaded projections 12 and 13 adapted to receive couplings for connection, respectively, to hot and cold water service pipes, and midway between these inlet ports is an internally screw-threaded outlet adapted to receive a tubular outlet member 14 having port-holes 15 upon which an outlet or discharge spout 16 is swivelled. Parallel counter-sunk faces of the spout 16 have gaskets 17 seated therein, and the lower gasket is seated in a counter-bore on the body 11 whereby the spout is sealed watertight on its swivel when member 14 is screwed down.

The valve body 11 has a cylindrical bore of three diameters, the mid-section 18 having the smaller diameter, the end sections 19 and 20 having the largest diameter and internally screw-threaded, and the section 21 a diameter intermediate the bores 18 and 19. The bore 18 is designed to receive a close fitting tubular member 22 having closed ends with ports in the cylindrical surface and adapted for both longitudinal and rotary movement and functioning both as a valve member and a mixing chamber as and for the purpose hereinafter described.

The tubular member 22 has a flanged head 23 and gasket 24 of smaller diameter than bore 20 to afford sufficient clearance for the passage of fluid entering from port 13, and functions as a valve adapted for rotary and longitudinal movement within the valve chamber 20 and seats against the shoulder of bore 18. Head 23 is in the form of a truncated pyramid or cone having a T-slot 25 in which the head 26 of screw-threaded valve-stem 27 is free to turn. The valve-stem works in the internally screw-threaded neck 28 of packing-cup 29 which is screwed into and closes the bore 20 of the casing. The valve-stem passes through the packing and nut 30 and the protruding end has a handle or knob 31 operatively fixed thereon for imparting longitudinal movement by means of the head 26 and screw-stem 27 to the mixing chamber and valves mounted thereon.

The opposite end of tubular member 22 has a socket as seen at 32 in Figure 1 with flats 33 as seen in Figure 7 adapted to receive the correspondingly shaped end 34 of valve-head 35 which is secured to member 22 by screw 36 for rotary and longitudinal movement therewith. Head 35 has a tubular extension 37 of reduced diameter on which is sleeved a gasket 38, the outer diameter of the head and gasket being sufficiently smaller than the bore 21 to afford the necessary clearance for the passage of fluid entering from port 12. The bore of head 35 and extension 37 is squared as seen in Figures 1 and 5 for a sliding fit with the squared end of valve-stem 39 on which knob 40 is operatively fixed for rotating the ported mixing chamber 22 without affecting the longitudinal position thereof.

The valve-stem 39 has a collar 41, Figure 1, fixed thereon which serves as a bearing for the valve-stem in packing-cup 42, and the collar being seated between the internal flange of the cup and packing-ring 43 also serves to hold the stem against longitudinal movement. The packing-ring 43 is held against the collar 41 by the packing and screw-plug 44. Packing-cup 42 screws into body section 19 as shown in Figure 1 and has a tubular extension 45 of reduced diameter provided with port-holes 46, a flange 47, and a gasket 48 which is compressed between the flange and the shoulder of bore 21. The inner rim of tubular extension 45 forms the seat for gasket 38 of valve-head 35 to control the flow from inlet 12 through ports 46 to the mixing chamber.

The extent of rotary and longitudinal movement of the mixing chamber 22 and valves 24—38 is limited by a stop-pin 49 which is screwed through the wall of casing 11 and projects into valve chamber 21 and a cut-out 50 on the surface of valve-head 35, Figures 2 and 6. The cut-out 50 extends circumferentially approximately 240° as shown in Figure 6, so that the rotary movement of mixing chamber and valve-heads 23—35 will be limited approximately to a two-thirds revolution.

The mixing chamber 22 has an outlet port 51 which extends circumferentially approximately 240° to coincide with the cut-out 50 on valve-head 35, and the width of port 51 is greater than the diameter of port 14 so that during the rotary and longitudinal movement imparted to chamber 22 by the turning of knobs 31 and 40 in either direction, the outlet from the mixing chamber to discharge port 14 will be direct and always remain open. The mixing chamber as shown in Figure 1 has two inlet ports 52 and 53 positioned preferably near opposite ends of the chamber for the admission of fluid from ports 12 and 13, respectively, by way of channels 54 and 55, respectively, from valve chambers 21 and 20.

The inlet ports 52 and 53 may be of any suitable angular, ovate, or circular shape, or may be formed by a series of perforations, but the preferred shape is quadrilateral, and more specifically trapezoidal, as shown in Figures 11 to 14, the essential feature being an elongated aperture larger at one end and tapering to a small end or point, and the several ports being of equal area, although for certain uses the areas may vary in definite proportions to provide predetermined rates of flow through each port. For the specific use as illustrated in the drawings, ports 52 and 53 are shown as elongated apertures having square and right-angled areas with the tapering ends projecting circumferentially in opposite directions and in overlapping relation longitudinally of the cylindrical chamber 22 as indicated by Figure 14. Thus it will be seen that the ports 52—53 are so located relative to channels 54 and 55 that at full opening of either port a square aperture is presented to the flow channel as indicated in Figure 11, and at any intermediate position of ports 52—53 the combined area of the openings over the channels 54—55 will equal a full square opening as indicated in Figures 12 to 14. The location of port apertures 52—53 on chamber 22 relative to the length of the channels 54—55 is such that the areas of the port openings are not affected by the longitudinal movement of the chamber in effecting the adjustment of inlet valves 24—38. Thus the longitudinal movement of chamber 22 through the rotation of knob 31 simultaneously opens valves 24—38 and regulates the flow volume, and the rotary movement of the chamber by knob 40 controls the flow through either of the ports 52—53 to effect a discharge from outlet 16 of the flow from either supply port, and to regulate the combined flow through those ports to effect the desired degree of mixture or temperature of the discharge from outlet 16 without varying the discharge volume.

The direction of movement of the chamber 22 is indicated by the arrow points in Figure 2. On turning the knob 31 in the direction indicated as "On" the rotation of screw-stem 27 draws the chamber toward the knob to unseat valves 24—38 for admitting fluid simultaneously from inlets 13—12 to channels 55—54, and into the mixing chamber. When knob 31 is turned in the opposite direction to the limit of its rotary movement screw-stem 27 will move chamber 22 and seat valves 24—38 to shut off the flow from inlet ports 13—12 to channels 55—54 and hence there will be no flow into the mixing chamber and to the outlet spout 16 regardless of the rotary position of the chamber and the position of its ports 52—53 relative to channels 54—55.

As shown in Figures 1 and 2 valves 24—38 are unseated, but not to the full extent as indicated by the space between the stop-pin 49 and the flange of valve-head 35 in Figure 2, thus allowing a medium flow to the mixing chamber. The rotary position of the mixing chamber as shown in Figures 1 and 2 is the midway position as indicated by the position of the shoulders of cut-out 50 relative to stop-pin 49 in Figure 6. In this rotary position of the chamber the tapered parts of ports 52—53 will be equalized over the channels 54—55 as illustrated diagrammatically in Figure 12 so that the volume of flow through the ports will be equal and effect an equal mixture in the mixing chamber of the flow entering from supply ports 12—13. When the chamber 22 is rotated to the limit of its movement by turning knob 40 in the direction indicated as "Cold" port 53 will be in the fully open position and port 52 in its entirely closed position as indicated in Figure 11, and hence the flow into chamber 22 will be from inlet port 13 only and therefore no mixture, and to vary the rate of flow or discharge from spout 16 knob 31 is turned toward "On" to increase the flow or toward "Off" to decrease or shut off the flow entirely into chamber 22. When chamber 22 is rotated in the opposite direction indicated as "Hot" the flow through port 53 is reduced while the flow through port 52 is proportionately increased as indicated in Figure 13, thus maintaining a constant flow into the mixing chamber, but of varying degree from inlet channels 54—55 to vary the degree of mixture or temperature. And when the chamber is rotated to the limit of its movement in this direction port 53 will be shut off entirely and the relative position of ports 52—53 will be the opposite to that shown in Figure 11. Thus it will be seen that the degree of mixture or temperature may be varied by turning knob 40 in either direction without varying the discharge flow from spout 16.

It will be noted that in operating the valve as illustrated, knob 31 is rotated solely to turn on or cut off the flow from the several inlet or supply pipes, and that knob 40 is rotated solely to regulate the degree of mixture or temperature. Thus it will be observed that these two movements are operatively independent of each other, and that the operation of the flow control does not affect the functioning of the mixture or temperature control. Furthermore it will be observed that the operating handles or knobs may be operated in left or right sequence, or simultaneously, to obtain the desired flow volume and the desired degree of mixture or temperature.

It will also be noted that on cutting off the flow to the mixing chamber by the closure of valves 24—38 the mixing chamber need not be rotated to shift ports 52—53 entirely beyond channels 54—55 in either direction to cut off the flow into the mixing chamber since the flow is completely cut off by the seating of valves 24—38, and consequently the mixing chamber ports may be left at any point or at either extreme as limited by stop-pin 49 and readjusted for any degree of mixture after or before the flow is re-established by the unseating of valves 24—38.

It will also be noted that the complete cut off at either channels 54—55 is obtained as the apex of the port aperture 52 or 53 passes beyond the channel as indicated in Figure 11, thus obtaining a tapered cut off at those ports, thereby preventing rapid cut off, regardless of the rapidity of rotation of the operating handle or knob and mixing chamber, and completely avoiding waterhammer.

To employ the valve structure illustrated and described for dividing the flow from a supply line into separate channels all that is necessary is to substitute a supply pipe connection for the outlet member 14 and employ ports 12 and 13 as outlets instead of inlets. Under such condition the fluid supply entering at port 14 will flow through port 51 into chamber 22 and out through ports 52—53 into channels 54—55 to valve chambers 21—20 and pipe line connections 12—13. The control of valves 24—38 and ports 52—53 by knobs 31 and 40 would function as above described and thus fluid entering at port 14 could be divided and directed into separate lines or receivers in any desired quantity.

1. In a valve structure of the character described, the combination of a casing having a plurality of supply ports adapted for connection to supply pipes and a single discharge port, a valve chamber communicating directly with each supply port, a reciprocating valve in each of said chambers, operating means for actuating said valves in unison, a rotary mixing chamber having a single outlet port opening directly to said discharge port and a plurality of inlet ports spaced for single or simultaneous flow into the chamber, flow channels leading directly from said inlet valve chambers to said mixing chamber inlet ports, and another operating means for rotating said chamber to shift said mixing chamber inlet ports into communication with said flow channels.

2. In a valve structure of the character described, the combination of a casing having a plurality of supply ports adapted for connection to supply pipes and a single discharge port, a valve chamber communicating directly with each supply port, a mixing chamber rotated within said casing, valves moving with said mixing chamber to control the flow thereto from said supply ports, a single outlet port from said mixing chamber communicating directly with said discharge port, a plurality of inlet ports on said mixing chamber spaced for single or simultaneous flow into the chamber, separate flow channels leading from said valve chambers to said mixing chamber inlet ports, operating means for reciprocating said mixing chamber to actuate said flow control valves, and another operating means for rotating said chamber independently of its reciprocating movement to regulate the flow into the chamber from said flow channels.

3. In a valve structure of the character described, the combination of a casing having a plurality of supply ports adapted for connection to supply pipes and a single discharge port, a valve chamber communicating directly with each supply port, a rotary mixing chamber having a plurality of inlet ports spaced circumferentially thereon, an outlet port on said mixing chamber communicating directly with said discharge port, flow channels leading from said valve chambers to individual mixing chamber inlet ports, a plurality of valve-heads mounted on said mixing chamber for controlling the flow through said channels, operating means for reciprocating said mixing chamber for actuating said valves, and means for rotating said mixing chamber independently of its reciprocating movement to successively vary the inlet area of each of the mixing chamber inlet ports communicating with said flow channels.

4. In a valve structure of the character described, the combination of a casing having a plurality of supply ports adapted for connection to supply pipes and a single discharge port, supply chambers communicating with the supply ports, a valve in each of said chambers, a movable mixing chamber within said casing having a single outlet port opening directly to said discharge port, a plurality of inlet ports formed on said mixing chamber and spaced for single or simultaneous flow into said chamber, flow channels leading from said supply chambers to said mixing chamber inlet ports, operating means for actuating the aforesaid valves in unison to control the flow simultaneously from the supply chambers into said flow channels, and another operating means for moving the mixing chamber to regulate the flow into said chamber from said flow channels without varying the volume flow to the discharge port.

5. In a valve structure of the class described, the combination of a single valve casing having a pair of supply chambers and a discharge port, a mixing chamber adapted for rotation and reciprocation within said casing, a pair of inlet channels leading from the supply chambers to said mixing chamber inlet ports, a valve element at each end of said mixing chamber co-operating with valve seats on said casing for controlling the flow of fluid from the supply chambers to said mixing chamber, operating means at one end of said casing for imparting reciprocating movement to said mixing chamber to control the flow of fluid from the supply chambers to the mixing chambers, operating means at the opposite end of said casing for imparting rotary movement to said mixing chamber to regulate the admission of fluids into said chamber, said mixing chamber having a pair of inlet ports and a single outlet port, and said mixing chamber inlet ports being similarly shaped with tapering outlines and located relatively to the aforesaid inlet channels so that as the mixing chamber is rotated one of said ports will present gradually increasing port area to its inlet channel while the other port presents a relatively decreasing port area to its inlet channel whereby the flow of fluids into the mixing chamber may be varied from one extreme to the other without varying the volume flow to the discharge port of the casing.

JOHN F. OVARY.

REFERENCES CITED

The following references are of record in the file of this patent:

UNITED STATES PATENTS

| Number | Name | Date |
|---|---|---|
| 960,558 | Koken | June 7, 1910 |
| 1,783,264 | Sirotek | Dec. 2, 1930 |
| 2,214,619 | Krieger | Sept. 10, 1940 |
| 2,308,127 | Symmons | Jan. 12, 1943 |